United States Patent
Lin (10) Patent No.: US 7,261,331 B2
(45) Date of Patent: Aug. 28, 2007

(54) TWO-WAY HIDDEN LATCH AND APPARATUS UTILIZING THE SAME

(75) Inventor: Tzu-Wei Lin, Yilan County (TW)

(73) Assignee: Asustek Computer Inc., Taipei (TW)

( * ) Notice: Subject to any disclaimer, the term of this patent is extended or adjusted under 35 U.S.C. 154(b) by 136 days.

(21) Appl. No.: 10/957,677

(22) Filed: Oct. 5, 2004

(65) Prior Publication Data

US 2005/0087993 A1 Apr. 28, 2005

(30) Foreign Application Priority Data

Oct. 24, 2003 (TW) .............................. 92129532 A (51) Int. Cl.
*E05C 19/10* (2006.01)
*E05C 19/16* (2006.01)

(52) U.S. Cl. .................. 292/116; 292/95; 292/108; 292/121; 292/124; 292/128; 292/219; 292/304; 292/251.5; 361/679; 312/223.1

(58) Field of Classification Search ............ 292/116, 292/95, 96, 98, 101, 108, 121, 124, 127, 292/128, 194, 213, 215, 219, 251.5, 304, 292/120, 129, DIG. 11, DIG. 61, DIG. 37, 292/11, 24, 44, 45, 229, 336; 361/679–683, 361/686; 312/223.1, 223.2
See application file for complete search history.

(56) References Cited

U.S. PATENT DOCUMENTS

| 294,774 | A | * | 3/1884 | Eberlein | 292/120 |
|---|---|---|---|---|---|
| 447,543 | A | * | 3/1891 | Monks | 292/116 |
| 543,908 | A | * | 8/1895 | Stone | 292/32 |
| 553,856 | A | * | 2/1896 | Johnston et al. | 292/116 |
| 704,619 | A | * | 7/1902 | Cramer | 292/116 |
| 972,177 | A | * | 10/1910 | Ferris | 292/71 |
| 976,027 | A | * | 11/1910 | Beehler | 292/121 |
| 980,379 | A | * | 1/1911 | Wilcox | 292/116 |
| 1,022,576 | A | * | 4/1912 | Beehler | 292/121 |
| 1,071,802 | A | * | 9/1913 | Schlatz | 292/116 |
| 1,133,254 | A | * | 3/1915 | Backus | 292/127 |
| 2,504,716 | A | * | 4/1950 | Morand | 292/128 |
| 2,712,464 | A | * | 7/1955 | Collar et al. | 292/128 |
| 3,003,800 | A | * | 10/1961 | Hammond | 292/11 |
| 3,455,590 | A | * | 7/1969 | Zerfoss | 292/128 |
| 3,463,530 | A | * | 8/1969 | Modes | 292/128 |

(Continued)

*Primary Examiner*—Carlos Lugo
(74) *Attorney, Agent, or Firm*—Birch, Stewart, Kolasch and Birch, LLP (57) ABSTRACT

An apparatus with a two-way hidden latch. A main body comprises a magnet disposed under a retainer, which fixes the two-way latch disposed in a cover portion. The cover portion can be placed on the main body with a first or second surface facing downward. The cover portion comprises a first and second opening and a two-way latch is disposed near the two openings. When the cover portion is open, the two-way latch is fixed at an original position and hidden in the cover portion. When the cover portion covers the main body with the first surface facing downward, the two-way latch is drawn by the magnet to a first position, engaging the retainer. Moreover, when the cover portion covers the main body with the second surface facing downward, the two-way latch is drawn by the magnet to a second position, engaging the retainer.

21 Claims, 12 Drawing Sheets

U.S. PATENT DOCUMENTS

| | | | | |
|---|---|---|---|---|
| 3,749,434 A | * | 7/1973 | Gley | 292/128 |
| 3,918,751 A | * | 11/1975 | Blake | 292/126 |
| 4,632,440 A | * | 12/1986 | Adrian et al. | 292/229 |
| 4,653,784 A | * | 3/1987 | Lee | 292/71 |
| 5,106,132 A | * | 4/1992 | Bako et al. | 292/128 |
| 5,271,253 A | * | 12/1993 | Cassada et al. | 70/276 |
| 5,393,110 A | * | 2/1995 | Nakamori et al. | 292/216 |
| 5,927,772 A | * | 7/1999 | Antonucci et al. | 292/336.3 |
| 6,122,152 A | * | 9/2000 | Goto et al. | 361/1 |
| 6,129,395 A | * | 10/2000 | Schlesener et al. | 292/128 |
| 6,517,129 B1 | * | 2/2003 | Chien et al. | 292/251.5 |
| 6,659,516 B2 | * | 12/2003 | Wang et al. | 292/251.5 |
| 6,762,928 B2 | * | 7/2004 | Lo | 361/681 |
| 6,927,972 B1 | * | 8/2005 | Wang et al. | 361/683 |
| 2003/0090862 A1 | * | 5/2003 | Hsiang | 361/681 |
| 2004/0189017 A1 | * | 9/2004 | Chen et al. | 292/251.5 |

* cited by examiner

TWO-WAY HIDDEN LATCH AND APPARATUS UTILIZING THE SAME

This Nonprovisional application claims priority under 35 U.S.C. §119(a) on Patent Application No(s). 092129532 filed in Taiwan, Republic of China on Oct. 24, 2003, the entire contents of which are hereby incorporated by reference.

BACKGROUND

The invention relates to a latch structure, and in particular to a two-way hidden latch suitable for a tablet PC.

Figure 1A:
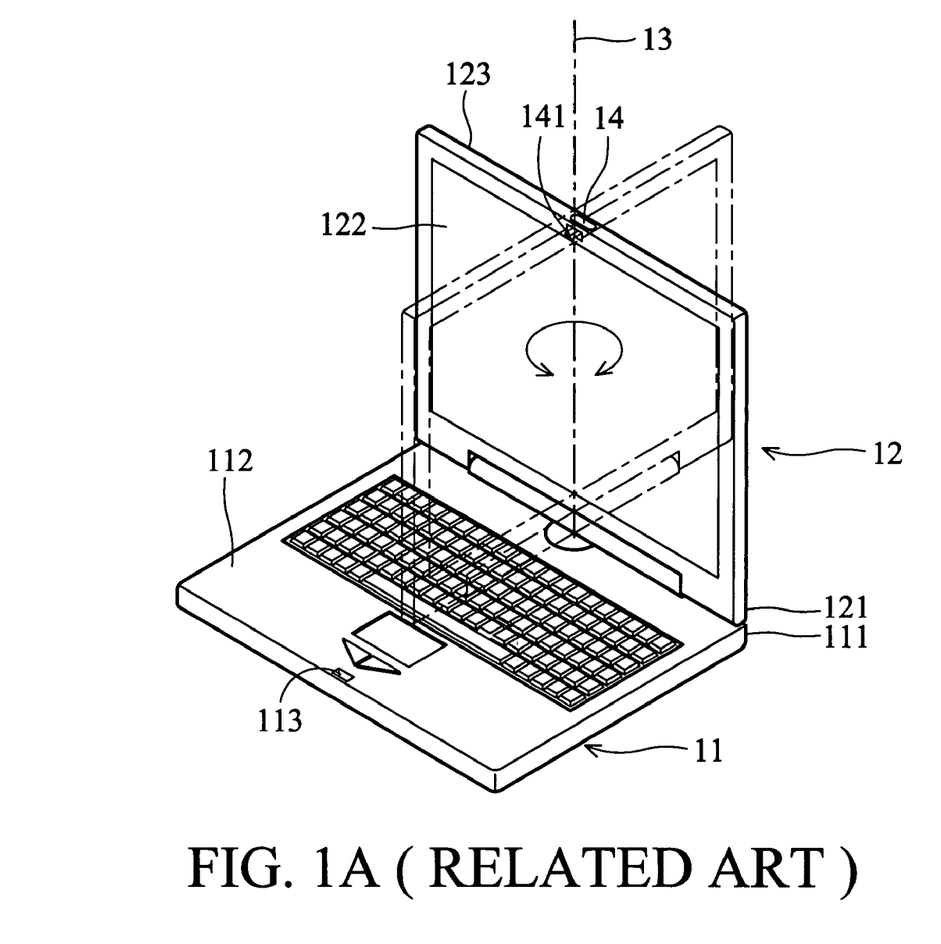
FIG. 1A is a schematic view of a conventional tablet PC with a rotatable LCD monitor.
Figure 1B:
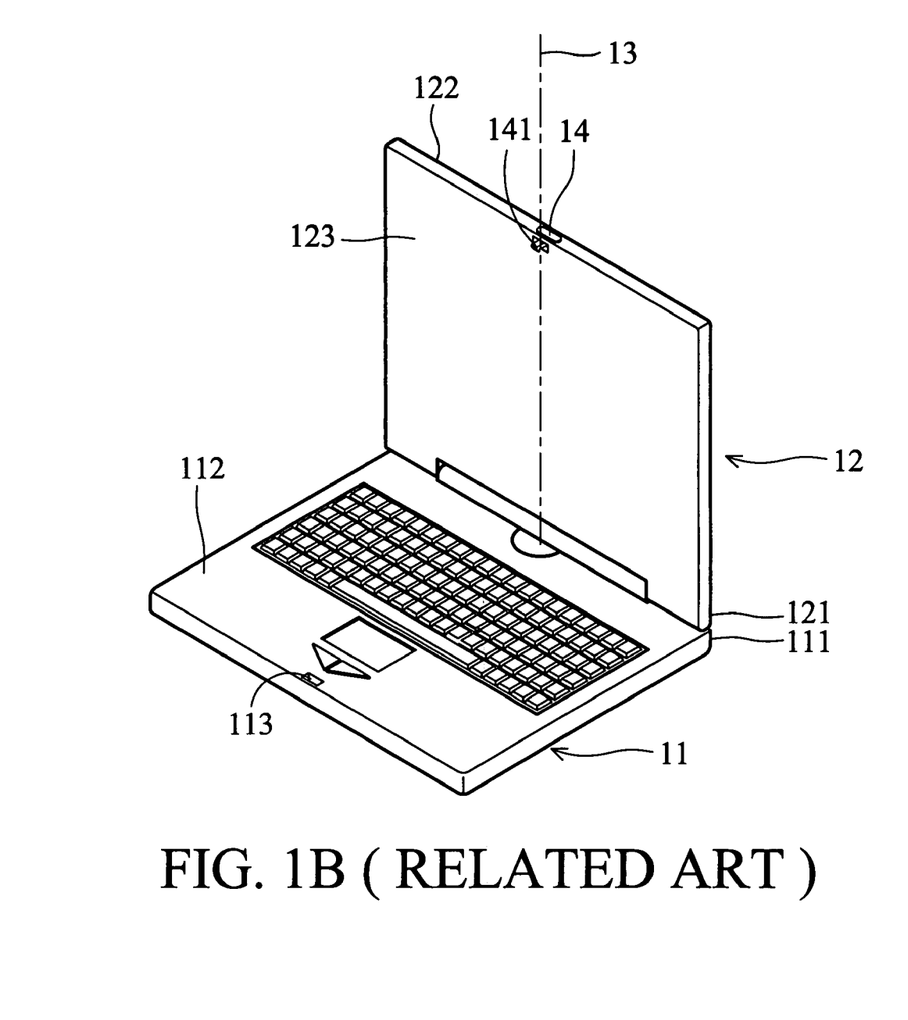
FIG. 1B is a schematic view of a conventional tablet PC when the LCD monitor is rotated by 180°.

FIG. 1A shows a conventional tablet PC with a rotatable liquid crystal display (LCD), and FIG. 1B shows the LCD of the tablet PC rotated by 180°. In FIGS. 1A and 1B, the conventional tablet PC 10 comprises a main body 11 and an LCD 12. A connection portion 121 of the LCD 12 is connected to the rear portion 111 of the main body 11. The LCD 12 can be closed on the main body 11 with its front 122 facing downward. The LCD 12 can also be rotated about a predetermined axis 13 and closed on the main body 11 with the front 122 of the LCD 12 facing upwards.

The LCD 12 of the conventional tablet PC 10 comprises a latch 141 protruding at the top center of the front 123 thereof. In FIG. 1A, the latch 141 is capable of engaging the retainer 113 on the top surface 112 of the main body 11 when the LCD 12 is closed with its front 122 facing downward. In FIG. 1B, the LCD 12 is rotated by 180°. The latch 141 is moved through the switch 14, protruding from the back 123 of the LCD 12. Thus, the latch 141 is capable of engaging the retainer 113, fixing the LCD 12 on the main body 11 with the front 122 facing upward.

The latch 141 used in the conventional tablet PC 10, however, protrudes out of the shell of the LCD 12, such that the profile of the tablet PC 10 is not smooth and attractive enough. Moreover, the latch 141 must be adjusted after the LCD 12 is rotated, thus, operation of the conventional tablet PC 10 is inconvenient.

SUMMARY

Accordingly, embodiments of the invention provide a latch structure for a notebook computer, such that the LCD of the notebook computer can be fixed on the main body by opposite two surfaces.

Embodiments of the invention provide a hidden latch structure, which can be received in the LCD of a notebook computer when the LCD is open.

Embodiments of the invention provide a latch structure comprising a moving member connected to a fixing member by a shaft and a spring disposed thereon. The moving member comprises a hook and an extending portion. The spring comprises a first end and a second end. The first and second ends press on either side of a connection portion of the fixing member when the moving member is in an original position. The extending portion pushes the first end in a first direction by the first side when the moving member rotates in the first direction. The second end is blocked by the second stop portion, such that the spring is compressed, providing an elastic force in an opposite second direction. The extending portion pushes the second end in the second direction by the second side when the moving member rotates in the second direction, the first end is blocked by the first stop portion, such that the spring is compressed, providing an elastic force in the first direction.

In some embodiments of the invention, the hook is T-shaped and comprises permeable materials. The shaft is a rivet. The spring is a torsion spring.

Embodiments of the invention further provide an apparatus with a hidden latch comprising a main body, cover portion, and a latch. The main body of the notebook computer comprises a retainer and a magnetic member. The cover portion is connected to the main body at one side. The cover portion has a first surface and an opposite second surface. The first surface and surfaces is capable of covering on the main body alternatively with the first or second surfaces facing downward. The cover portion comprises a first opening on the first surface and an opposite second opening on the second surface. The latch is adjacent to the first and second openings. When the cover portion covers the main body with the first surface facing downward, the two-way latch is drawn by the magnet to a first position, engaging the retainer. Moreover, when the cover portion covers the main body with the second surface facing downward, the two-way latch is drawn by the magnet to a second position, engaging the retainer.

In some embodiments of the invention, the latch comprises a moving member connected to a fixing member by a shaft and a spring disposed thereon. The moving member comprises a hook and an extending portion. The spring comprises a first end and a second end. The first and second ends press on either side of a connection portion of the fixing member when the moving member is in an original position.

The extending portion pushes the first end in a first direction by the first side when the moving member rotates in the first direction. The second end is blocked by the second stop portion, such that the spring is compressed, providing an elastic force in an opposite second direction. Furthermore, the extending portion pushes the second end in the second direction by the second side when the moving member rotates in the second direction. The first end is blocked by the first stop portion, such that the spring is compressed, providing an elastic force in the first direction.

When the cover portion covers the main body with the first surface facing downward, the moving member is attracted by the magnetic member, rotating in the first direction and clasping the retainer. When the cover portion covers the main body with the second surface facing downward, the moving member is attracted by the magnetic member, rotating in the second direction and clasping the retainer. The elastic force provided by the spring is smaller than a magnetic force provided by the magnetic member.

In some embodiments of the invention, the apparatus further comprises a button movably disposed in the main body. The button comprises a shelter portion comprising high-reluctance material. When the button is forced to move with the shelter portion, inserted into a position between the magnetic member and the hook, the magnetic force applied to the hook is reduced. Thus, the hook releases the retainer. The button is connected to the main body through a resilient element, providing restoring force.

The magnetic member is a magnet. The moving member comprises permeable materials.

Furthermore, the apparatus provided in embodiments of the invention can be a notebook computer, and the cover portion is a liquid crystal display (LCD), which is electrically connected to the main body thereof. The LCD is capable of folding on the main body alternatively with its front or back surfaces.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the subsequent detailed description and accompanying drawings, which are given by way of illustration only, and thus are not limitative of the present invention, and wherein.

DETAILED DESCRIPTION

Figure 2A:
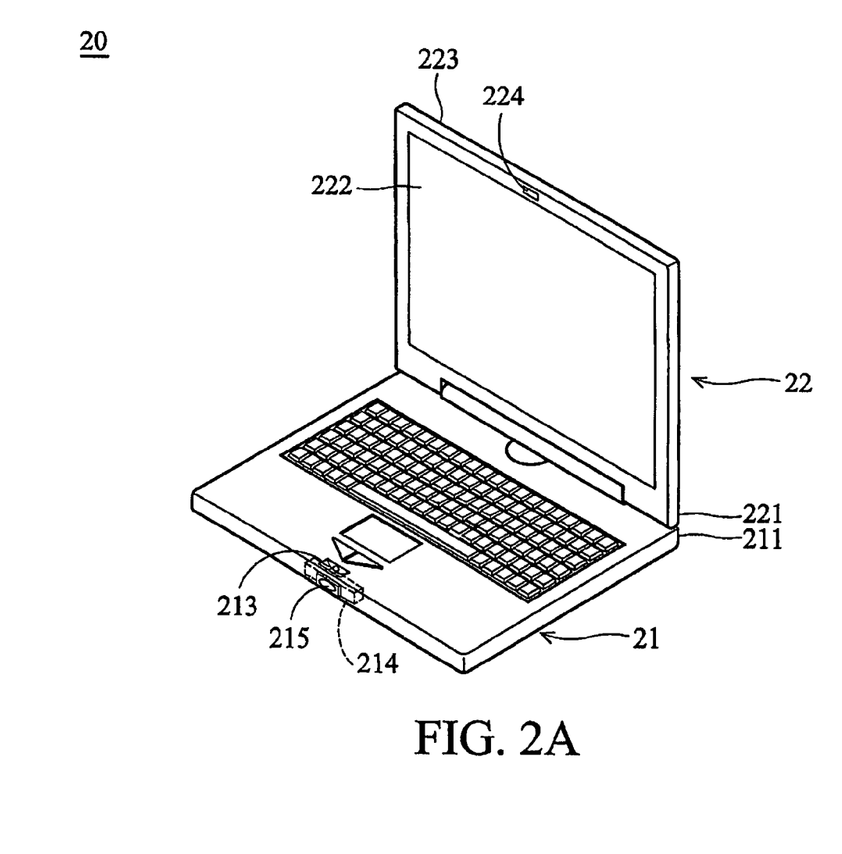
FIG. 2A is a schematic view of a notebook computer with a hidden latch in an embodiment of the invention.
Figure 2B:
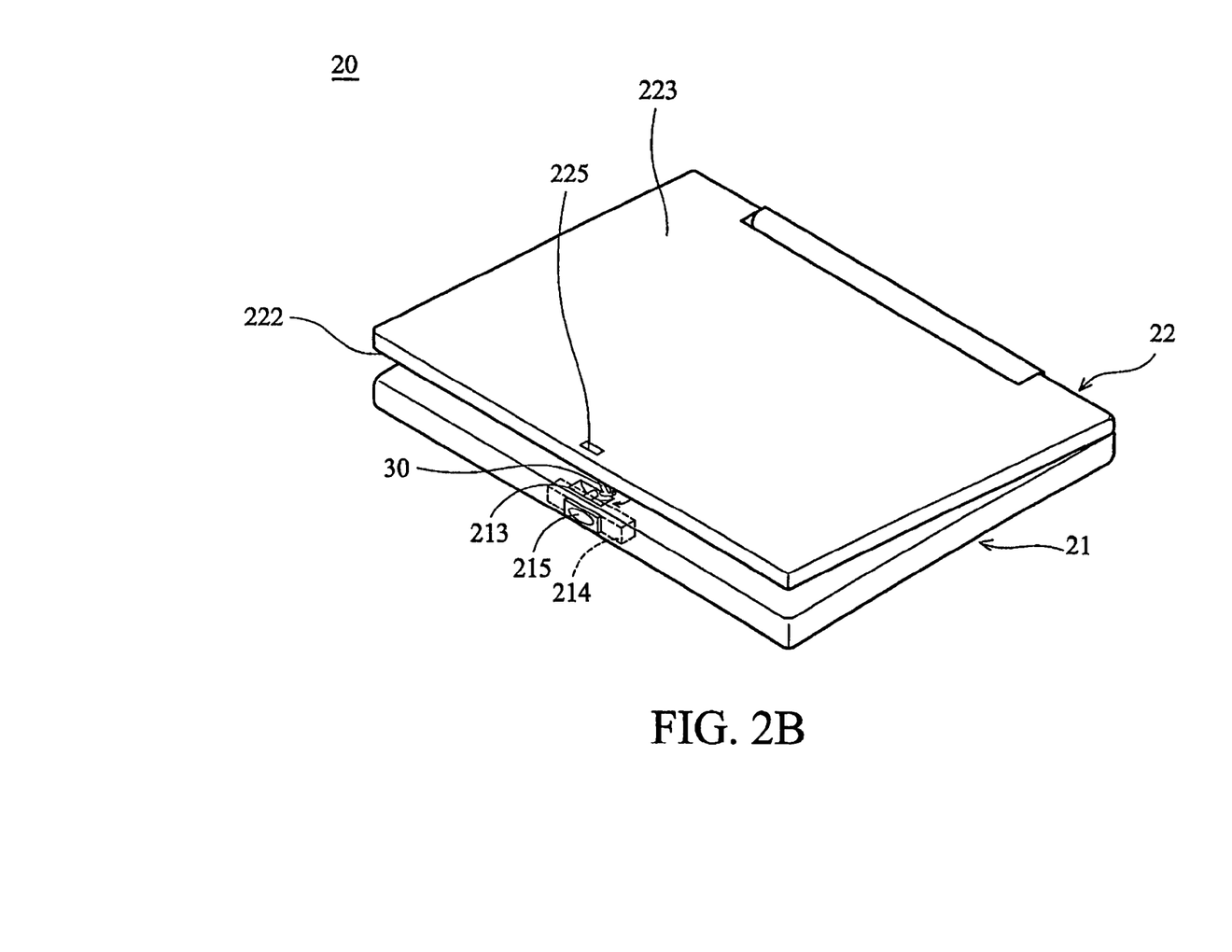
FIG. 2B is a schematic view of the notebook computer in FIG. 2A with the LCD closed thereon and facing downward.

FIG. 2A is a schematic view of a notebook computer with a hidden latch of an embodiment of the invention. FIG. 2B shows the notebook computer with the LCD closed thereon and facing downward. The apparatus with a hidden latch of some embodiments of the invention is a notebook computer 20 comprising a main body 21 and a cover portion, or an LCD 22. The LCD 22 comprises a front 222, a back 223, and a connection portion 221 connected to the rear portion 211 of the main body 21. The LCD 22 can be rotated about a predetermined axis and closed on the main body 21 with either the front 222 or back 223 facing downward as is conventional tablet PCs. The main body 21 comprises a retainer 213 and a magnetic member 214 disposed thereunder. Furthermore, the LCD 22 comprises a first opening 224 on the front 222, an opposite second opening 225 on the back 223, and a latch 30 adjacent to the first opening 224 and second opening 225. When the LCD 22 is open, the latch 30 can be received in the shell of the LCD 22.

Figure 2C:
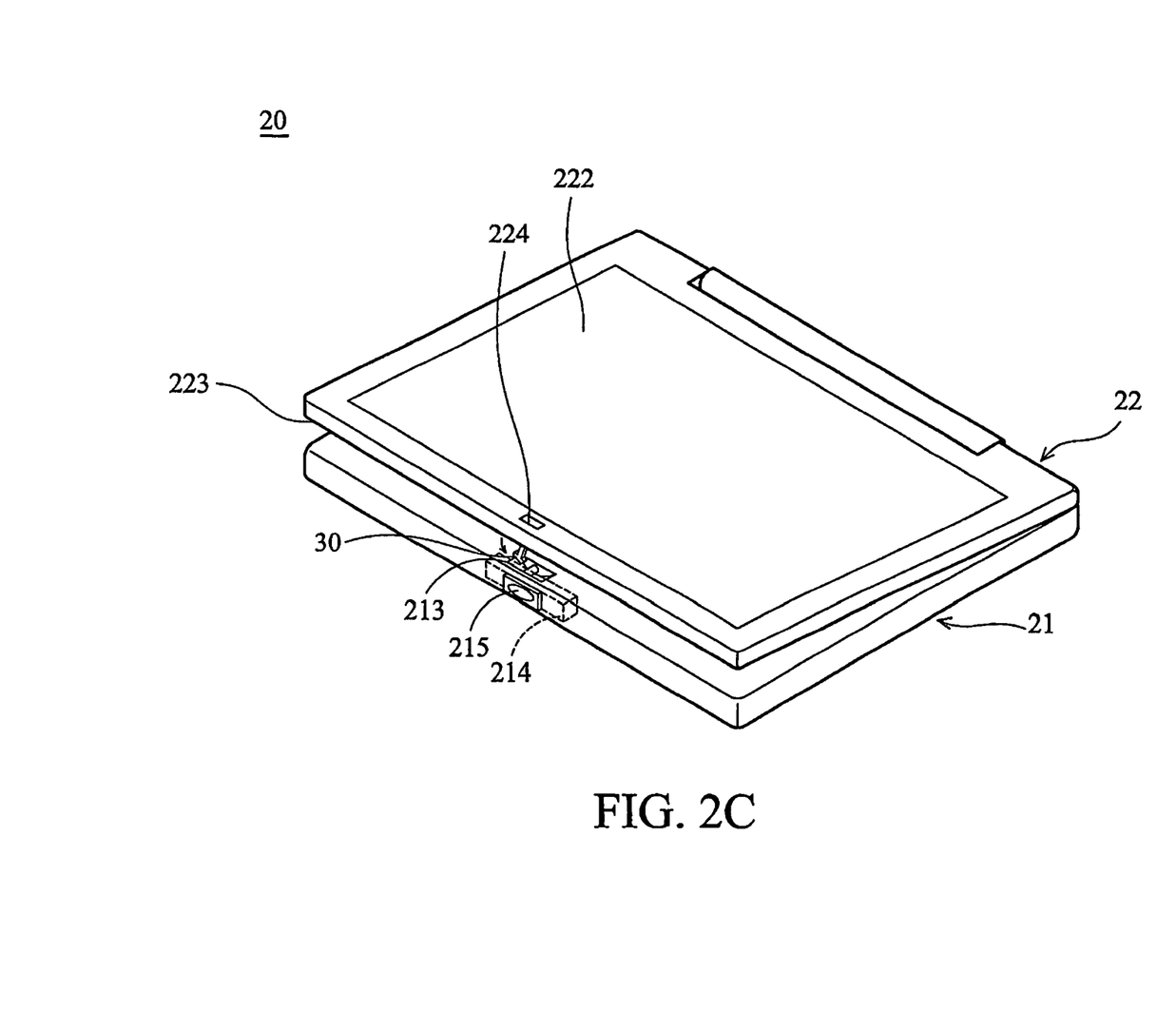
FIG. 2C is a schematic view of the notebook computer in FIG. 2A with the LCD closed thereon and facing upward.

FIG. 2C is a schematic view of the notebook computer in FIG. 2A with the LCD closed thereon and facing upward. The magnetic member 214 of some embodiments of the invention is a magnet, and the latch 30 comprises permeable materials. In FIG. 2B, when the LCD 22 is closed on the main body 21 with the front 222 facing downward, the latch 30 is attracted by the magnetic member 214, rotating clockwise and protruding from the first opening 224. Simultaneously, the latch 30 engages the retainer 213 from the right side, fixing the LCD 22 on the main body 21. In FIG. 2C, when the LCD 22 is rotated 180° and closed on the main body 21 with the back 223 facing downward, the latch 30 is attracted by the magnetic member 214, rotating counterclockwise and protruding from the second opening 225 as shown in FIG. 2C. Simultaneously, the latch 30 engages the retainer 213, fixing the LCD 22 on the main body 21 with the front 222 facing upwards as is possible with a conventional tablet PC.

Figure 3A:
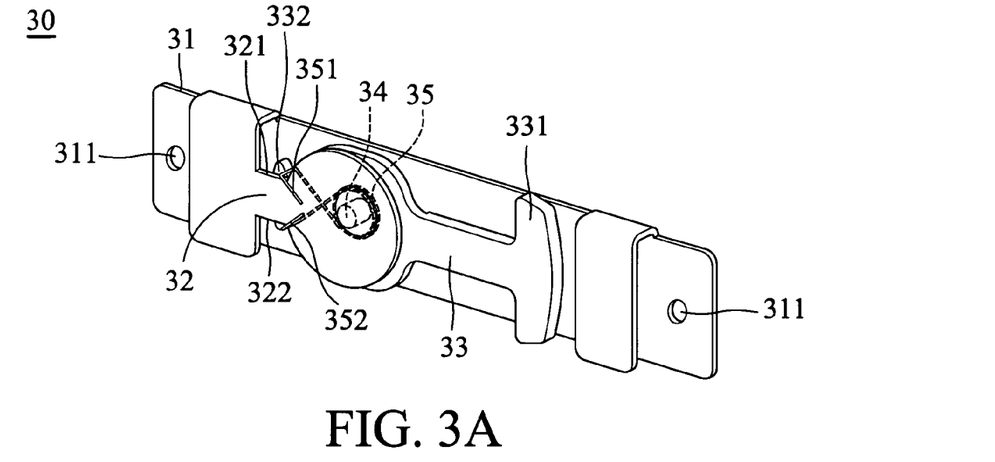
FIG. 3A is a perspective view of the hidden latch in an embodiment of the invention.
Figure 3B:
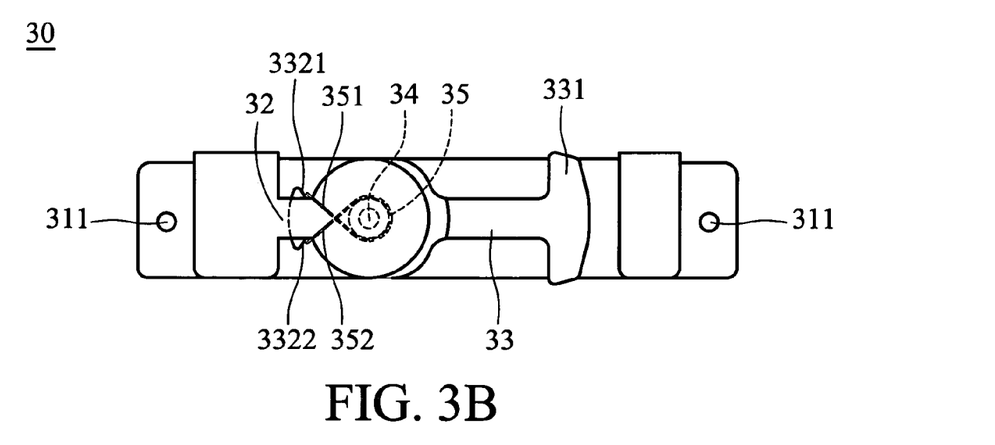
FIG. 3B is a front view of the hidden latch.
Figure 3C:
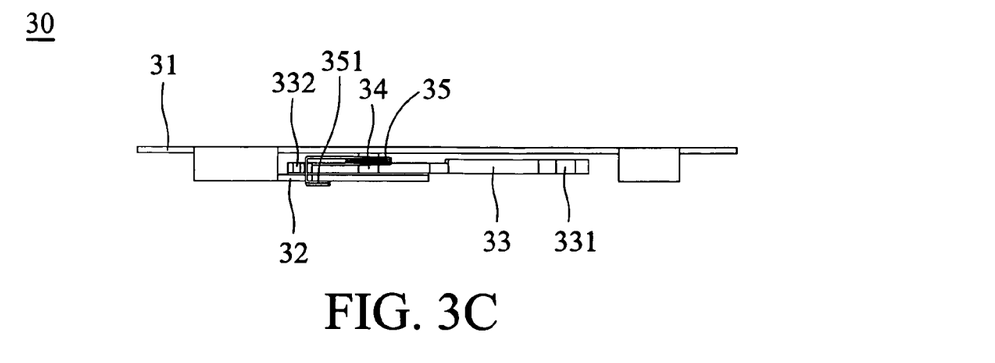
FIG. 3C is a top view of the hidden latch.

FIG. 3A is a perspective view of a hidden latch of an embodiment of the invention. FIGS. 3B and 3C are a front and top views of the hidden latch thereof. In FIGS. 3A~3C, the latch 30 comprises a fixing member 31 with a connection portion 32, and a moving member 33 with a hook 331 and an extending portion 332. The moving member 33 is pivoted on the fixing member 31 via a shaft 34, or a rivet for example. The moving member 33 comprises permeable materials and can be attracted by the magnetic member 214. The latch 30 also comprises a spring 35 disposed on shaft 34. The spring 35 is a torsion spring and comprises a first end 351 and a second end 352. Due to resilience, the first and second ends 351 and 352 abut one side of the connection portion 32 when the moving member 33 is in an original position as shown in FIG. 3A. The first end 351 abuts a first stop surface 321 of the connection portion 32, such that the first stop surface 321 can block the first end 351 from moving counterclockwise. The second end 352 abuts a second stop surface 322 of the connection portion 32, such that the second stop surface 322 can block the first end 352 from moving clockwise.

In FIG. 3B, the extending portion 332 of the moving member 33 is fishtail-like. The first end 351 and second end 352 can abut either side of the extending portion 332, such that the moving member 33 is restrained in the original position by resilience of the spring 35.

Figure 4A:
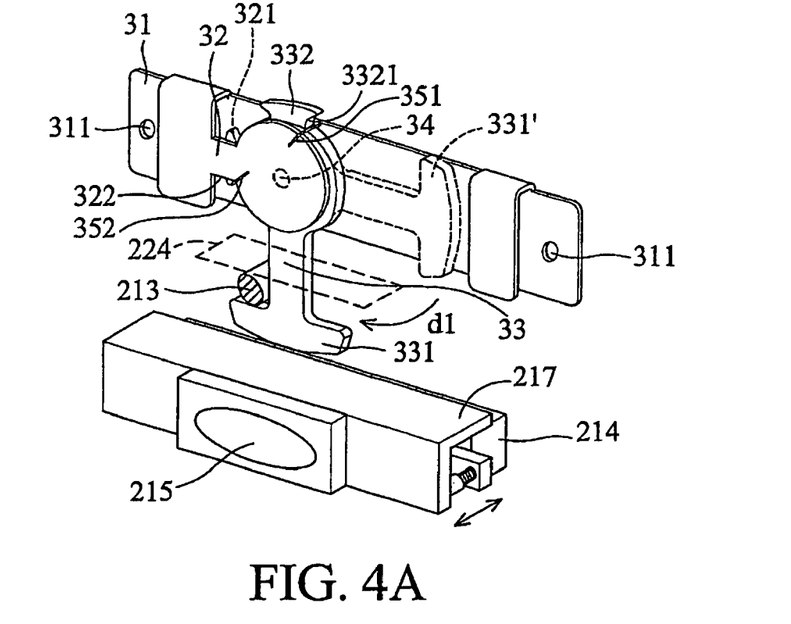
FIG. 4A shows the movement of the latch when the LCD is closed on the main body of the notebook computer in FIG. 2B.

FIG. 4A shows the movement of the latch when the LCD is closed on the main body of the notebook computer in FIG. 2B. In order to simplify the drawing, the main body and LCD of the notebook computer is eliminated, and the first opening 224 of the LCD is presented by dotted lines.

In FIGS. 2B, 3A, and 4A, the magnetic member 214 is a permanent magnet. The fixing member 31 of the latch 30 comprises two holes 311, such that the latch 30 can be disposed in the LCD 22 between the first and second openings 224 and 225, by screws or other fastening means. When the LCD 22 is closed on the main body 21 with the front 222 facing downward, the latch 30 is attracted by the magnetic member 214, protruding from the first opening 224 and rotating clockwise (d1) from the original position (denoted by 331') to a first position as shown in FIG. 4A. Simultaneously, the hook 331 of the moving member 33 engages the retainer 213, fixing the LCD 22 on the main body 21. Furthermore, when the moving member 33 rotates clockwise, the first side 3321 of the extending portion 332 pushes the first end 351 of the spring 35 clockwise. The second end 352 is blocked by the second stop portion 322, such that the spring 35 is compressed, providing a recover ing spring force in an opposite direction. The provided spring force is, however, smaller than the magnetic force. Thus, the hook 331 of the moving member 33 can be engaged with the retainer 213.

Figure 4B:
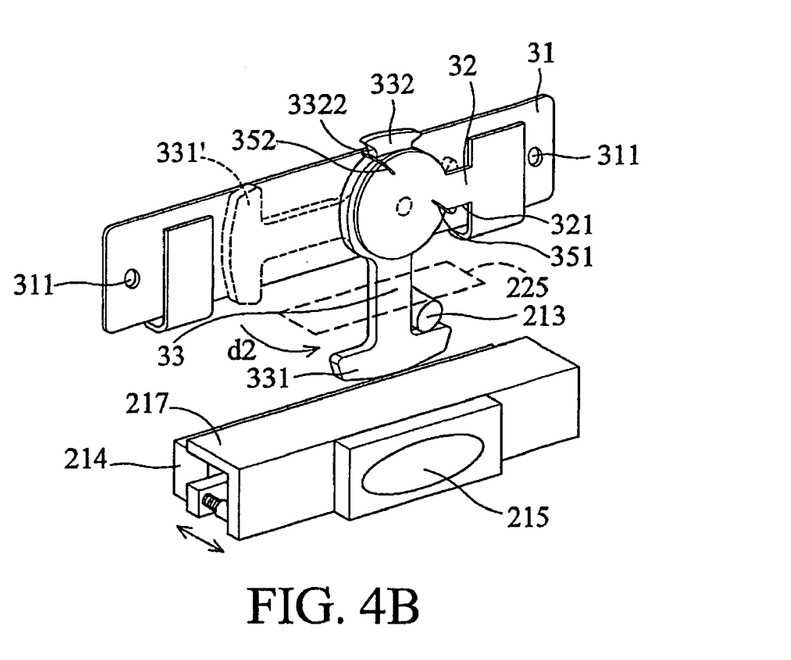
FIG. 4B shows the movement of the latch when the LCD is closed on the main body of the notebook computer as shown in FIG. 2C.
Figure 4C:
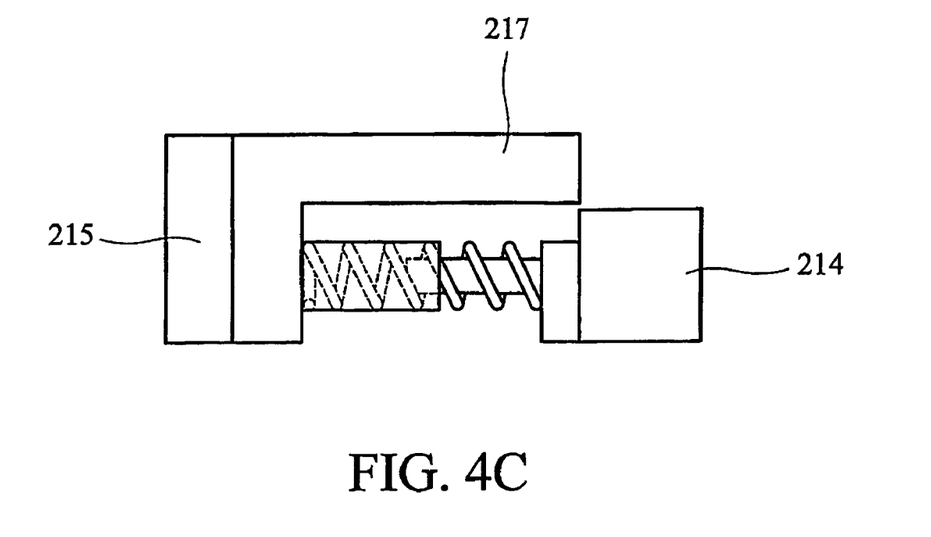
FIG. 4C is a schematic view of the button in a released position.
Figure 4D:
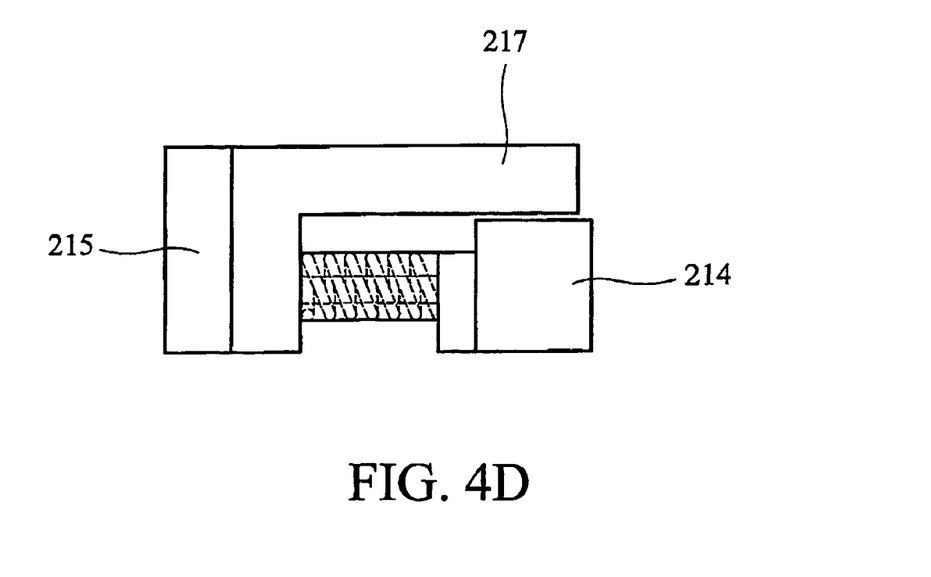
FIG. 4D is a schematic view of the button in a compressed position.

The main body 21 of the notebook computer 20 of some embodiments comprises a button 215 disposed thereon and movable between a released position (FIG. 4C) and a compressed position (FIG. 4D). A spring 216 is disposed between the button 215 and a partition of the main body, providing an outward recovering spring force. The button 215 further comprises a shelter portion 217 comprising high-reluctance material, such as plastic. When the button 215 is pushed from the released position to compressed position, the shelter portion 217 is inserted into the space between the magnetic member 214 and the hook 331, reducing the magnetic force exerted on the hook 331, such that the torque provided by the spring 35 becomes larger than the torque provided by the magnetic member 214. Simultaneously, the hook 331 of the moving member 33 releases the retainer 213 and is forced back to the original position as shown in FIGS. 3A and 4A.

FIG. 4B shows the movement of the latch when the LCD is closed on the main body of the notebook computer as shown in FIG. 2C. In order to simplify the drawing, the main body and LCD of the notebook computer is eliminated, and the second opening 225 of the LCD is presented by dotted lines.

In FIGS. 2A, 2C, 3A, and 4B, when the LCD is rotated 180° and closed on the main body 21 with the back 223 facing downward, the moving member 33 of the latch 30 is attracted by the magnetic member 214, protruding from the second opening 225 and rotating counterclockwise (d2) from the original position (denoted by 331') to a second position as shown in FIG. 4B. Simultaneously, the moving member 33 of the latch 30 engages the retainer 213, fixing the LCD 22 on the main body 21 with the front 222 facing upwards as is possible with a conventional tablet PC. Furthermore, when the moving member 33 rotates counterclockwise, the second side 3322 of the extending portion 332 pushes the second end 352 of the spring 35 counterclockwise, and the first end 351 is blocked by the first stop portion 321, such that the spring 35 is compressed, providing a recovering spring force. The provided spring force is, however, smaller than the magnetic force. Thus, the hook 331 of the moving member 33 is kept engaged with the retainer 213.

In FIG. 4A~4D, when the button 215 is forced from the released position (FIG. 4C) to compressed position (FIG. 4D), the shelter portion 217 is moved to a position between the magnetic member 214 and the hook 331, reducing the magnetic force exerted thereon. Thus, the torque provided by the spring 35 is larger than the torque provided by the magnetic force from the magnet 214. Simultaneously, the moving member 33 releases the retainer 213 and is forced back to the original position as shown in FIG. 3A.

Figure 5A:
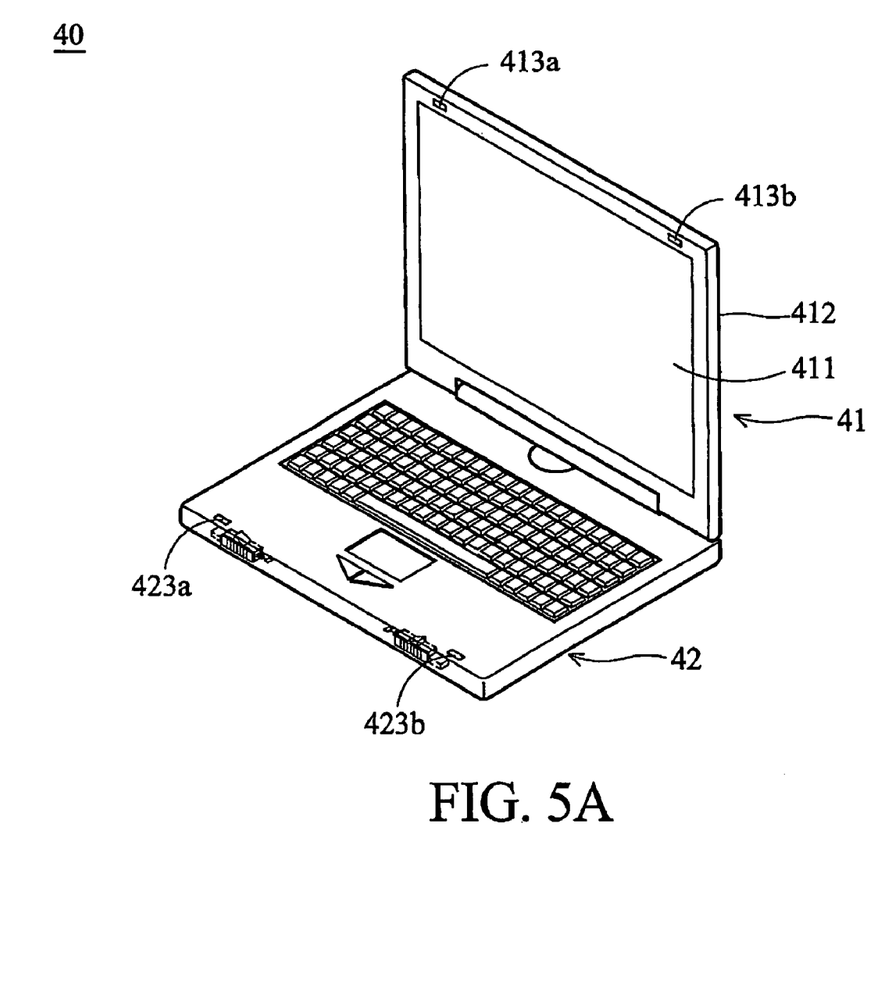
FIG. 5A is a schematic view of a notebook computer with a hidden latch in an embodiment of the invention.
Figure 5B:
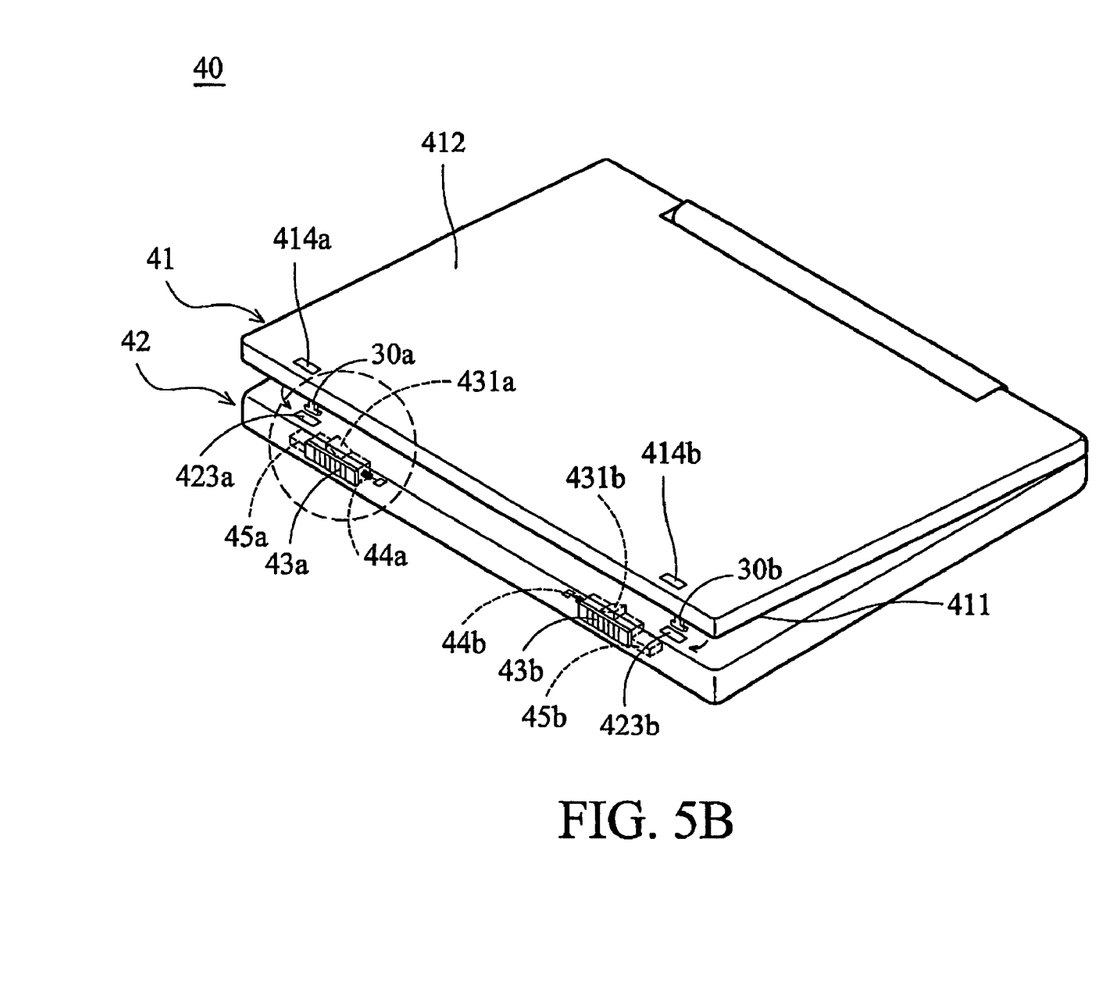
FIG. 5B is a schematic view of the notebook computer in FIG. 5A with the LCD closed thereon and facing downward.

FIG. 5A shows a notebook computer with hidden latches of another embodiment of the invention. FIG. 5B shows the LCD of the notebook computer as it closes on the main body with its front facing downward. Similar to the notebook computer as provided by other embodiments of the invention, the notebook computer 40 comprises a main body 42 and a cover portion, or an LCD 41. The LCD 41 comprises a front 411 and a back 412 and is connected to the rear portion of the main body 42. The LCD 41 can be rotated about a predetermined axis and closed on the main body 42 alternatively with the front 411 or back 412 facing downward as is possible with a conventional tablet PC.

In FIG. 5A, the main body 42 comprises two retainers 423a and 423b and two magnetic members 45a and 45b disposed thereunder. The LCD 41 comprises two first openings 413a and 413b on the front 411, two opposite second openings 414a and 414b on the back 412, and two latches 30a and 30b as provided in other embodiments. The latches 30a and 30b are disposed between the first openings 413a and 413b and second openings 413a and 413b and received in the shell when the LCD 41 is open.

In FIGS. 5A and 5B, two hidden latches 30a and 30b are disposed symmetrically in the LCD 41. When the LCD 41 is closed on the main body 42 with the front 411 facing downward, the latches 30a and 30b are attracted by the magnetic members 45a and 45b, rotating as indicated by the arrows (FIG. 5B) and protruding from the first openings 413a and 413b on the front 411. Simultaneously, the latches 30a and 30b engage the retainers 423a and 423b, securing the LCD 41 and the main body 42. Furthermore, the main body 42 of the notebook computer 40 in some embodiments comprise two buttons 43a and 43b connected thereto by springs 44a and 44b to provide recovering force and maintain the position of the buttons 43a and 43b.

Figure 5C:
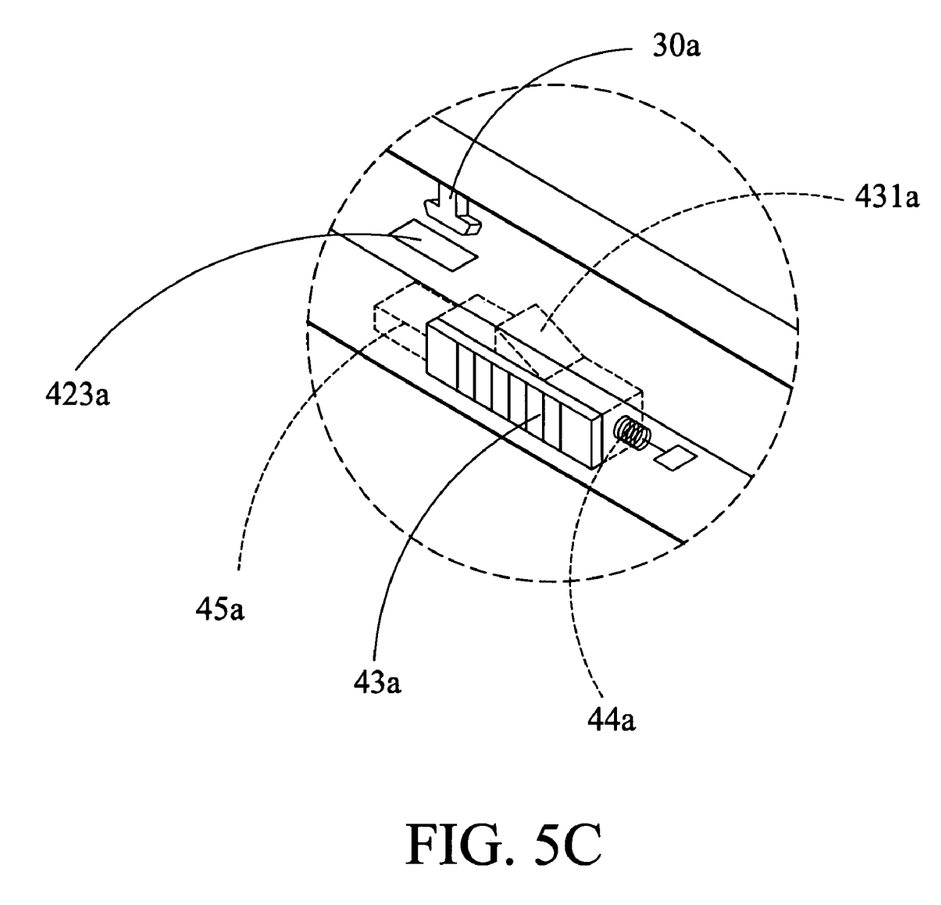
FIG. 5C is a schematic view of the enlarge area in FIG. 5B.

FIG. 5C is a partial enlarged view of the main body in FIG. 5B. In FIGS. 5B and 5C, each button 43a and 43b comprises a protrusion 431a and 431b separately pushing the latches 30a and 30b when the buttons 43a and 43b are forced to move from inner positions to outer positions. Simultaneously, the exerted force and the recovering spring force are larger than the magnetic force, such that the latches 30a and 30b are forced back to the original positions, releasing the retainers 423a and 423b as shown in FIG. 5A.

Figure 5D:
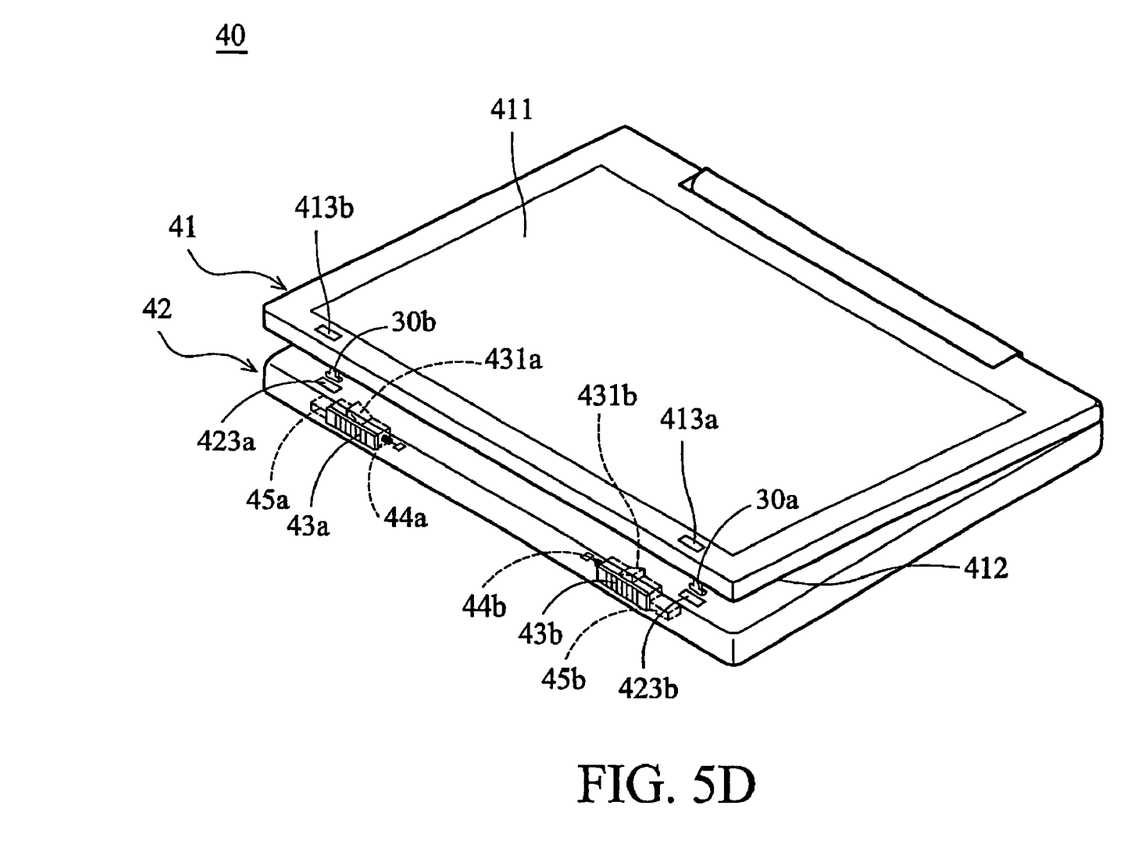
FIG. 5D is a schematic view of the notebook computer in FIG. 5A with the LCD closed thereon and facing upward.

FIG. 5D is a schematic view of the notebook computer in FIG. 5A with the LCD closed thereon and facing upward. In FIGS. 5A~5D, when the LCD 41 is rotated 180° and closed on the main body 42 with the back 412 facing downward, the positions of two latches 30a and 30b are exchanged with respect to the rotational axis of the LCD 41. The latches 30a and 30b are separately attracted by the magnetic members 45a and 45b, protruding from the second openings 414a and 414b and engaging the retainers 423a and 423b, such that the LCD 41 can be secured on the main body 42 with the front 411 facing upwards. Furthermore, when the buttons 43a and 43b are forced to release the LCD 41, the protrusions 431a and 431b of the buttons 43a and 43b are utilized to provide additional force, such that the additional and the recovering spring forces are larger than the magnetic force exerted on the latches 30a and 30b. Thus, the latches 30a and 30b are forced back to the original positions, releasing the retainers 423a and 423b as shown in FIG. 5A.

Moreover, the buttons 43a and 43b of the notebook computer in some embodiments can be replaced by a single button to push the latches 30a and 30b through conventional connection rod structure for added convenience.

Accordingly, notebook computers of embodiments of the invention provide a well-designed hidden latch structure, such that the LCD thereof can be fixed onto the main body by either surface. The hidden latch structure can be received in the LCD of a notebook computer when the LCD is open, such that the notebook computer has a better profile and can potentially be more user-friendly.

While the invention has been described by way of example and in terms of the preferred embodiments, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A latch structure, comprising:
   a fixing member with a first stop portion and a second stop portion, placed between a first position and a second, reversed position;
   a shaft disposed on the fixing member;
   a spring with a first end and a second end and disposed on the shaft, wherein the first end presses on the first stop portion and is blocked from rotating in a first direction when the fixing member is in the first position, and the second end presses on the second stop portion and is blocked from rotating in an opposite second direction when the fixing member is in the second position; and
   a moving member with a hook and an extending portion, wherein the moving member pivots on the fixing member through the shaft, the extending portion comprises a first side contacting the first end and a second side contacting the second end when the moving member rotates;
   wherein, when the moving member rotates in the first direction so that the spring presses against the extending portion without connecting with the first stop portion, and rotates in the second opposite direction so that the spring presses against the extending portion without connecting with the second stop portion.

2. The latch as claimed in claim 1, wherein the extending portion pushes the first end in the first direction by the first side when the moving member rotates in the first direction, and the second end is blocked by the second stop portion, such that the spring is compressed, providing an elastic force in the second direction.

3. The latch as claimed in claim 2, wherein the extending portion pushes the second end in the second direction by the second side when the moving member rotates in the second direction, and the first end is blocked by the first stop portion, such that the spring is compressed, providing an elastic force in the first direction.

4. The latch as claimed in claim 1, wherein the moving member comprises permeable materials.

5. The latch as claimed in claim 1, wherein the shaft is a rivet.

6. The latch as claimed in claim 1, wherein the spring is a torsion spring.

7. The latch as claimed in claim 1, wherein the first direction is clockwise.

8. The latch as claimed in claim 1, wherein the first direction is counterclockwise.

9. The latch as claimed in claim 1, wherein the hook is T-shaped.

10. An apparatus with a hidden latch, comprising:
    a main body with a retainer;
    a cover portion connected to the main body at one side;
    a magnetic member disposed in the main body adjacent to the retainer, and
    a latch disposed in the cover portion and comprising:
    a fixing member with a first stop portion and a second stop portion;
    a shaft disposed on the fixing member;
    a spring with a first end and a second end, disposed on the shalt, wherein the first end presses on the first stop portion and is blocked from rotating in a first direction, and the second end presses on the second stop portion and is blocked from rotating in an opposite second direction; and
    a moving member with a hook and an extending portion, pivoting on the fixing member trough the shaft, wherein the extending portion comprises a first side contacting the first end, and a second side contacting the second end when the moving member rotates.

11. The apparatus as claimed in claim 10, wherein the cover portion comprises a first surface and an opposite second surface and covers the main body alternatively with the first surface or the second surface facing downward, and the cover portion comprises a first opening on the first surface and an opposite second opening on the second surface, the latch being adjacent to the first and second openings.

12. The apparatus as claimed in claim 10, wherein the hook is T-shaped.

13. The apparatus as claimed in claim 10, wherein the moving member comprises permeable materials.

14. The apparatus as claimed in claim 10, wherein the shaft is a rivet.

15. The apparatus as claimed in claim 10, wherein the spring is a torsion spring.

16. The apparatus as claimed in claim 11, wherein when the cover portion covers the main body with the first surface facing downward, the moving member is attracted by the magnetic member, rotating in the first direction and clasping the retainer, the extending portion pushes the first end in the first direction by the first side when the moving member rotates, and the second end is blocked by the second stop portion, such that the spring is compressed, providing an elastic force in the second direction.

17. The apparatus as claimed in claim 16, wherein the elastic force provided by the spring is smaller than a magnetic force provided by the magnetic member.

18. The apparatus as claimed in claim 11, wherein when the cover portion covers the main body with the second surface facing downward, the moving member is attracted by the magnetic member, rotating in the second direction and clasping the retainer, the extending portion pushes the second end in the second direction by the second side when the moving member rotates, and the first end is blocked by the first stop portion, such that the spring is compressed, providing an apposite elastic force in the first direction.

19. The apparatus as claimed in claim 16, wherein the opposite elastic force provided by the spring is smaller than a magnetic force provided by the magnetic member.

20. The apparatus as claimed in claim 19, further comprising a button movably disposed in the main body and having a shelter portion comprising high-reluctance material, wherein the shelter portion is moved to a position between the magnetic member and the hook, reducing the magnetic force.

21. The apparatus as claimed in claim 20, further comprising a resilient element connecting the button and the main body.

* * * * *